United States Patent [19]

Pizzorno

[11] Patent Number: 4,994,136
[45] Date of Patent: Feb. 19, 1991

[54] DEVICE FOR SPLICING THE ENDS OF ELASTOMERIC FILLERS APPLIED ON BEAD CORES OF PNEUMATIC TIRES

[75] Inventor: Augusto Pizzorno, Milan, Italy

[73] Assignee: Pirelli Coordinamento Pneumatici S.p.A., Italy

[21] Appl. No.: 345,299

[22] Filed: May 1, 1989

[30] Foreign Application Priority Data

May 18, 1988 [IT] Italy ................. 20621 A/88

[51] Int. Cl.⁵ .................. B29C 65/70; B29D 30/18
[52] U.S. Cl. .................. 156/502; 156/398; 156/507
[58] Field of Search .............. 156/157, 304.1, 304.2, 156/421, 403, 398, 475, 502, 503, 507, 122, 422, 460

[56] References Cited

U.S. PATENT DOCUMENTS

| | | | |
|---|---|---|---|
| 2,497,461 | 2/1950 | McChesney | 156/503 |
| 2,565,703 | 8/1951 | Strong | 156/503 |
| 2,647,555 | 8/1953 | Hinman | 156/122 |
| 2,679,888 | 6/1954 | Bolton | 156/507 |
| 3,976,534 | 8/1976 | Walter et al. | 156/507 |
| 4,226,663 | 10/1980 | Pirovano et al. | 156/422 |
| 4,484,975 | 11/1984 | McElroy | 156/304.2 |

Primary Examiner—Michael G. Wityshyn
Attorney, Agent, or Firm—Stevens, Davis, Miller & Mosher

[57] ABSTRACT

The described device comprises two primary pliers systems (2, 2a) arranged to engage through respective gripping elements (25, 26) the opposite ends of an elastomeric filler (45) applied on the radial outer peripheral of a bead core (46). The pliers systems are pivoted around an axis spaced from the center of the bead core, with respect to the convergence point of the V-shaped opening formed by the ends of the filler and are angularly moveable upon carrying out their movement, the pliers systems rotate with respect to the other according to an angulation greater than the value of the angle from by the ends of the filler and that the gripping means (25, 26) are shaped in such a way that in a radial outer zone of the filler, the ends are overlapped during the action of the pliers systems. An ancillary pliers system (24) compresses laterally the overlapped ends to effect the final splicing.

7 Claims, 3 Drawing Sheets

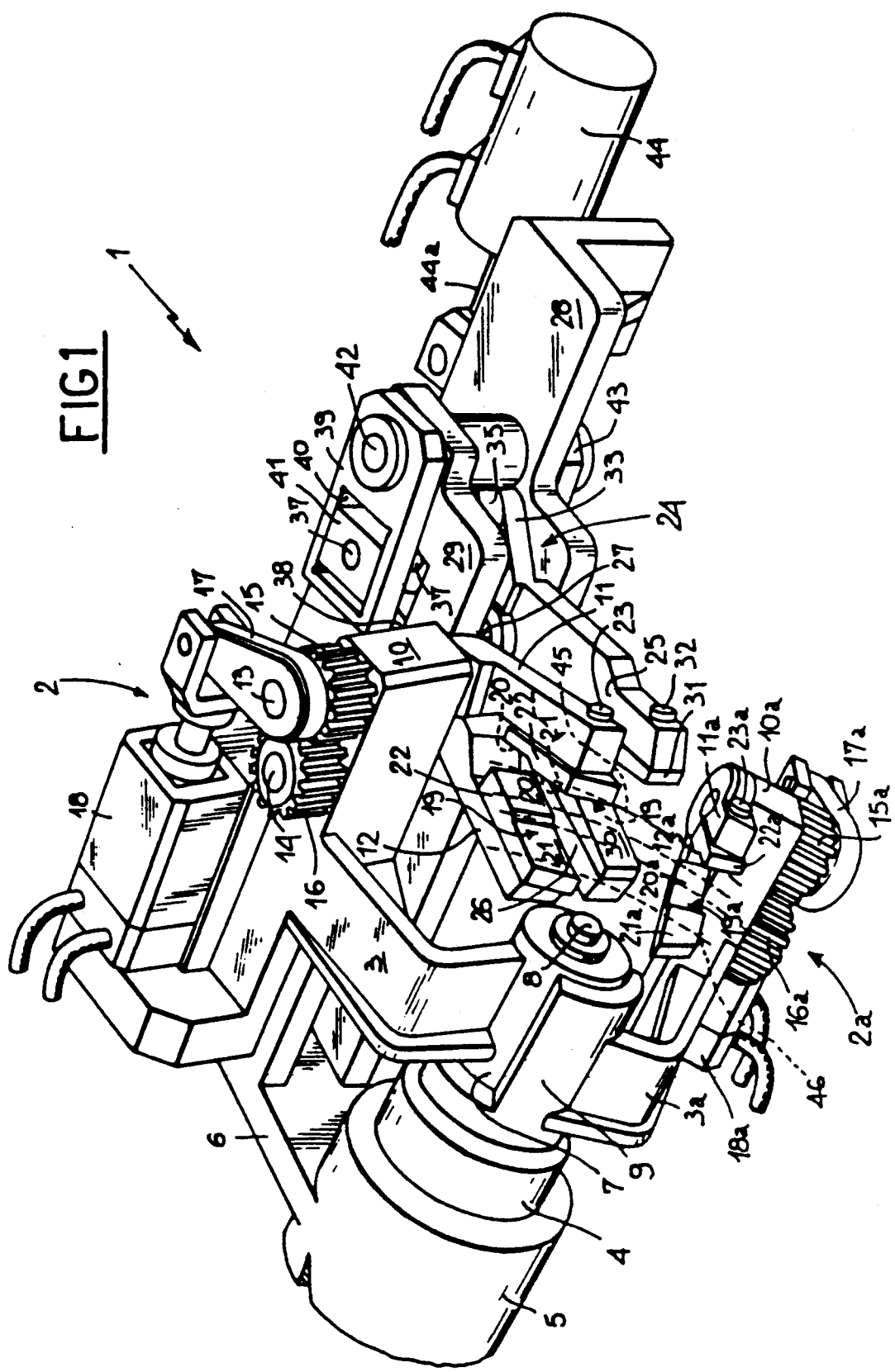

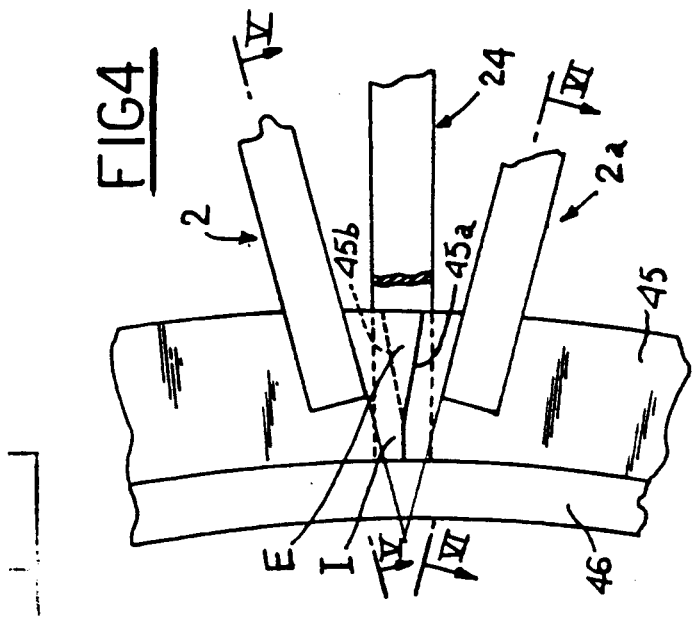
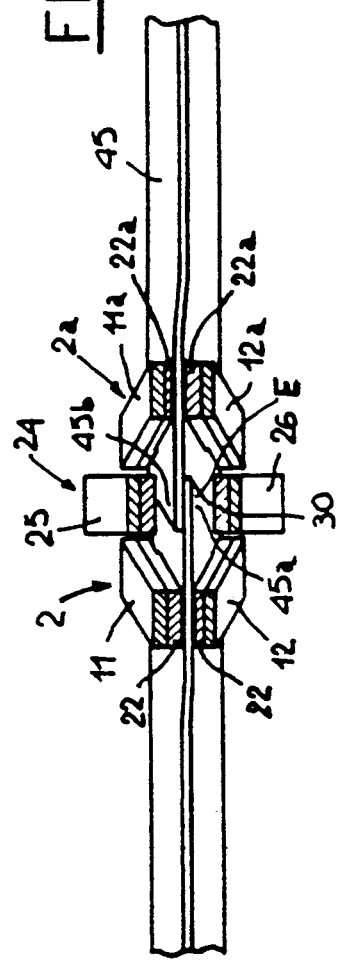
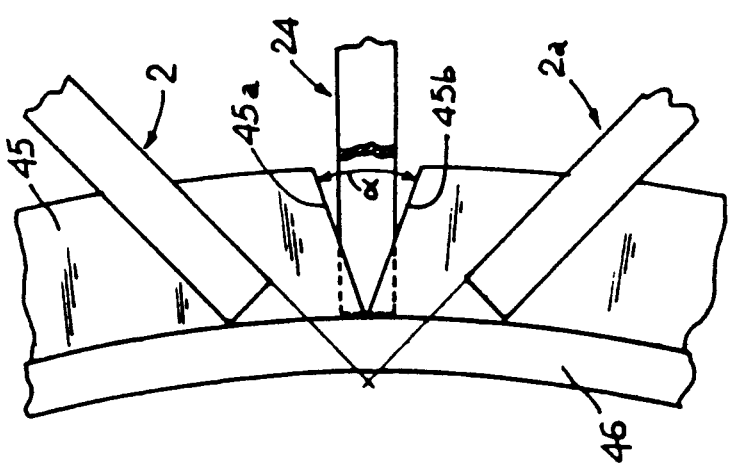

DEVICE FOR SPLICING THE ENDS OF ELASTOMERIC FILLERS APPLIED ON BEAD CORES OF PNEUMATIC TIRES

DESCRIPTION

The present invention concerns a device for splicing the ends of elastomeric fillers (so called "chafer strips") applied on bead cores of pneumatic tires, these fillers extending along the circumferential or radial outer chafer of a bead core. These fillers or chafer strips have facing ends which diverge with respect to one another, as viewed from the side of peripheral chafer of the bead core. This divergence is a substantially "V" configuration. The present device is of the type comprising two primary pliers systems, each one acting on one of the opposed ends of the filler through at least two facing gripping elements placed on the opposite ends of the filler strip at the side of the filler and moveable with respect to each other from an open position in which they are laterally separated by the filler, to a closed position in which they work against the opposite sides of the filler to exert opposed thrust forces. These primary pliers systems are angularly mobile around an axis of rotation near the point in which the "V" configuration of the filler ends converges to be led from a rest position in which they are mutually separated to permit the locking of the filler ends between said gripping elements to a splicing position in which they approach each other to splice said ends when the ends are held by the griping elements in said closed position.

As known, to construct pneumatic tires it is necessary to provide annular metal elements, usually called "bead cores", which, in the finished pneumatic tire are within the bead which defines the inner circumference of the tire; said bead cores have the function of supporting the whole pneumatic tire structure.

To this end the fabrics provided in the tire sidewall are turned up around the bead cores similar to the pages of a book.

In order to prevent the formation of air pockets between the ends of the fabric turned up around the bead core, an elastomeric filler, generally called a "chafer strip" and having a very elongate triangular cross-section is applied along the outer circumference of the bead core, said filler or chafer strip acting also as reinforcement for the bead on the finished tire.

Apparatuses capable of applying elastomeric material on the bead cords in a completely automated way are known.

In these apparatuses the chafer strip, produced in a previous extrusion process is cut, orthogonally to its length, into segments of suitable length and applied to the circumferential or radial outer chafer of the annular bead core as the bead core hoop is rotated about the center of the hoop circle.

At the end of this operation, the filler extends around the whole circumference of the bead core, but because of the difference between the radii of the circumferential inner chafer and the circumferential outer chafer of the filler, the respective facing opposite ends of the chafer strip diverge upon moving radially outwardly, away from the bead core center, this divergence being a substantially "V" configuration.

At this point it is necessary to splice the opposite ends of the filler in order to close the circle of the chafer and make the chafer strips as homogeneous as possible.

To accomplish this goal the two pliers systems of the present invention is used, each pliers grips the chafer in proximity of one of the filler ends enclosing the opposite sides thereof between two gripping elements that are moveable toward each other so as to be parallely oriented to the plane of the end of the filler being gripped by that pliers.

Subsequently the pliers systems goes through a movement of angular rotation about an axis which is positioned near the convergence point of the "V" formed by the filler ends.

On accomplishing this movement the pliers systems, and therefore the respective gripping elements, rotate one with respect to the other about an angle substantially equal to the angle between the "V" formed by the filler ends. Said ends, held by the gripping elements and pulled by the movement of the pliers systems, are therefore brought near to each other and pushed the one against the other so as to be butt-spliced.

From the aforesaid, it is to be noted that the splicing of the filler ends through the above described known devices not always takes place with satisfactory results.

This is firstly due to the fact that since generally the filler has a very elongate isosceles triangle cross-section, it is quite difficult to butt-splice the ends in the circumferential outer zones of the filler, where the cross-section thereof has a very reduced thickness.

Moreover, as the ends must be pushed one against the other to be spliced, an expansion, also considerable, of the filler cross-section in the splicing zone arises, as a result of the squeezing suffered by the material. Said expansion can create problems during the manufacture of the pneumatic tire and can result in structural imperfections of the finished tire.

The object of the present invention is to avoid the drawbacks found in the known technique, by means of a device which is able to butt-splice the ends of the filler in a reliable manner, without causing expansion of the section of the filler itself in the splicing zone.

This object and others, that better will appear from the present description, are substantially achieved by means of a device for splicing the ends of elastomeric fillers applied on the bead cores of pneumatic tires, characterized by the fact that said primary pliers systems, on translating from a rest position to a splicing position, rotate one with respect to the other. This rotation is according to an angulation which is greater than the angle formed by the "V" configuration of the filler ends when the pliers systems are in a rest position and by the fact that the clamping elements of each primary pliers systems work on the filler through respective contacting surfaces belonging to the other primary pliers systems and act on a circumferential outer zone of the filler to mutually place side-by-side the ends of the filler at said circumferential outer zone as a result of the translation of the pliers systems in the splicing position. The present device comprises at least an ancillary pliers system arranged between said primary pliers systems and provided with respective gripping elements symmetrically placed side-by-side with respect to the opposite sides of the filler and moveable for a mutual approach to compress the filler ends that are brought near by the action of the primary pliers systems.

BRIEF DESCRIPTION OF THE DRAWINGS

Further characteristics and advantages will appear from the detailed description of a preferred, but not exclusive, embodiment of a device for splicing the ends of elastomeric fillers applied to bead cores of pneumatic tires, in accordance with the present invention. Said description will be made hereinafter with reference to the attached drawings, made by way of non-limiting example, in which:

FIG. 1 is a partially broken away perspective view of a device according to the invention;

FIG. 3 is a diagrammatic and partially broken away lateral view of the device of the invention arranged to work on the ends of a filler applied on a bead core;

FIG. 4 is also a diagrammatic and partially broken away lateral view of the device according to an operative condition in which the primary pliers systems are in splicing position;

FIG. 7 is a diagrammatic top view showing the overlapping arrangement of the ends of the filler, in the radial outer zone, prior to the intervention of the ancillary pliers system.

DETAILED DESCRIPTION OF THE INVENTION

Figure 5:
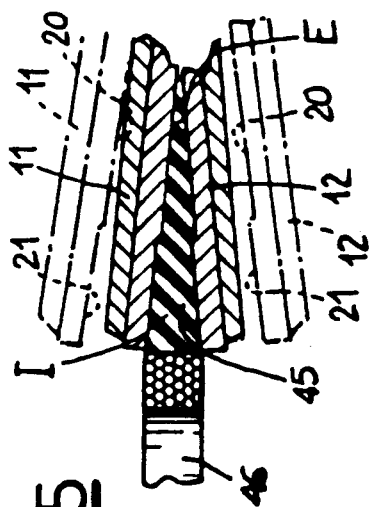
FIG. 5 is a diagrammatic section, taken along line V—V of FIG. 4, showing the deformation caused on the filler by the gripping elements belonging to a first primary pliers system.

Turning now to the figures in detail, reference numeral 1 indicates the whole device for splicing the ends of the elastomeric fillers applied on bead cores of pneumatic tires according to the present invention.

The device 1 comprises two primary pliers systems 2, 2a respectively opposite and supported by respective arms 3, 3a which in turn are engaged in a rotating manner, around a common axis, with a stationary sleeve 4 rigidly engaged with a collar 5 integral with a supporting frame 6, shown only in part. More particularly, arm 3, associated with the first pliers system 2, is fastened to a hub 7 splined on a driving small shaft 8, while the second arm 3a is fastened to a mobile sleeve 9 engaged in a rotating manner with the stationary sleeve 4 and engaging in turn, in a rotating manner, with the hub 7 of the first arm 3.

The primary pliers systems 2, 2a are constructed in a substantially like manner. Therefore, for the sake of brevity of description, reference will be made only to the first pliers system 2, except for different needs. In the drawings the members of the second pliers system 2a will be marked with the same reference numeral as that used for the corresponding members of the first pliers system 2, with the addition of the suffix "a".

The first primary pliers system 2 comprises a supporting block 10 integral with the first arm 3 which is engaged with at least a first and a second clamping element 11, 12 mutually opposed and disposed on the part turned toward the second primary pliers system 2a. More particularly the clamping elements 11, 12 are engaged in an oscillating manner with the supporting block 10 through respective pins 13, 14, each one of which is integral with one end of the respective clamping element and crossing in a rotating manner the supporting block itself.

On the pin 13 belonging to the first clamping element 11, on the part opposite to the clamping elements, a first gear wheel 15 is splined, said gear wheel engaging with a second like gear wheel 16 splined on the pin 14 associated to the second clamping element 12. The gear wheels 15 and 16 mutually connect the clamping elements 11 and 12, so as to impart an angular rotation of equal amount but in opposite sense to the other clamping element.

A control lever 17 is fastened on the pin 13; a first fluid mechanics cylinder 18 mounted on the supporting block 10 works on said control lever. Said first fluid mechanics cylinder 18 provides a mutual approaching or separation of the clamping elements 11, 12. Advantageously, in accordance with the present invention, the clamping elements 11 and 12 face each other by means of the respective contacting surfaces 19 having respective offset portions 20 which are suitably offset with respect to the longitudinal plane of the offset portions 20a presented by the clamping elements 11a, 12a belonging to the second primary pliers system 2a.

According to a preferred embodiment, the offset portions 20 are positioned consecutively to respective centering portions 21 presented by the contacting surface 19 in proximity of the free ends of the corresponding clamping elements 11, 12 and arranged coplanarly with respect to the centering portions 21a belonging to the second pliers systems 2a. As is shown by the attached sheets of drawing, the offset portions 20 belonging respectively to the first and second clamping element 11, 12 are offset with respect to the longitudinal plane in the same direction as the corresponding centering portion 21.

Therefore, while the offset portions 20 of the first clamping element 11 forms a surface reduction with respect to the corresponding centering portion 21, the offset portion of the second clamping element 12 forms a surface relief countershaped to the reduction.

Of course, the geometric characteristics and the dimensional ratios between the offset portions and the centering portions must be chosen according to the type of filler on which the splicing operation has to be effected. For this purpose, it is preferable that the contacting surfaces 19 on interchangeable plates 22 are releasably fastened to the clamping elements 11 and 12 through threaded elements 23.

According to the present invention the device 1 is also provided with at least one ancillary pliers system 24 symmetrically arranged between the primary pliers systems 2, 2a and comprising a first and second gripping element 25, 26 rotatably engaged on a stationary pin 27 connected between a first and second supporting plate 28, 29 integral with the supporting structure 6 and extending in a substantially parallel direction.

The gripping elements 25, 26 have respective contacting surfaces 30 substantially flat, disposed coplanarly to said centering portions 21, 21a and obtained preferably on respective interchangeable plates 31 releasably fastened to the gripping elements through threaded elements 32.

Figure 2:
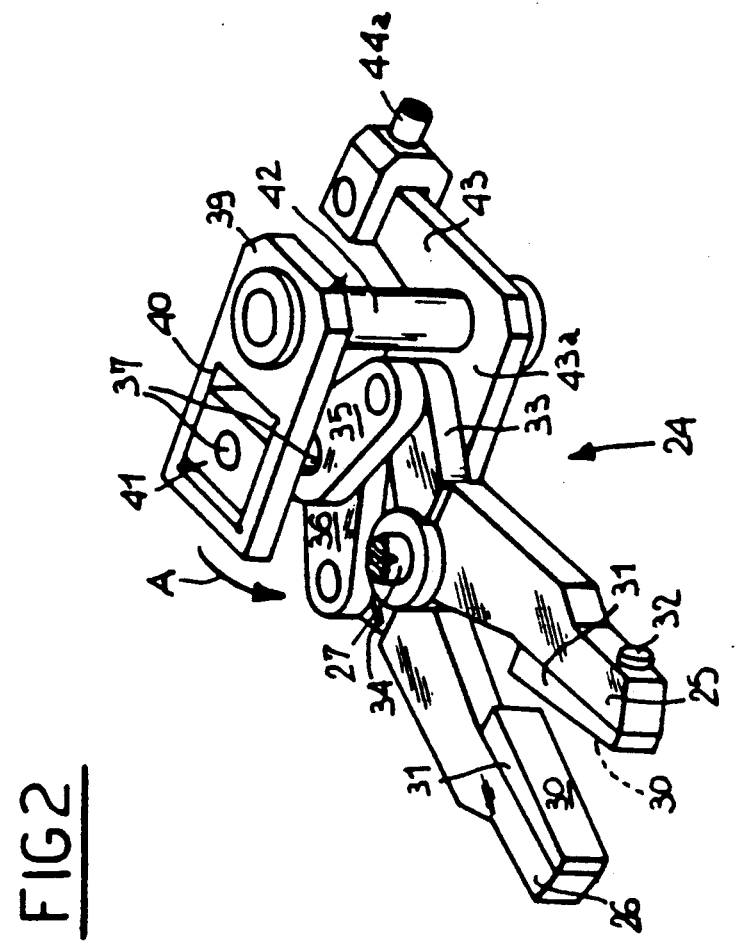
FIG. 2 is a perspective view of an ancillary pliers system as arranged in the device of the invention.

The gripping elements 25, 26 have moreover respective continuations 33, 34 that, as better shown in FIG. 2, diverge symmetrically when moving away from the stationary pin 27 to be rotatably engaged, at the respective free ends, with corresponding control rods 35, 36 mutually connected by mobile pin 37.

The mobile pin 37 is guided in a sliding manner by interposition of ball bearings or the like, through one or both the supporting plates 28, 29 along guiding slots 38 (only one is partially visible in FIG. 1) in the plates themselves and extending according to the axis of alignment between the mobile pin 37 and the stationary pin 27.

The mobile pin 37 is translated along the guiding slots 38 through at least a return plate 39 provided with a shaped opening 40 in which a small block 41, connected in turn to the mobile pin, is guided in a sliding manner transversely of the direction of the guiding slot 38. The return plate 39 is integral with a control pin 42 which crosses in a rotating manner the supporting plates 28, 29 and is rigidly engaged on the part opposite to the return plate, by a control lever 43; a driving fluid mechanics cylinder 44 (FIG. 1) connected to the first supporting plate 28 works on said control lever 43. The control lever 43 is provided with a continuation 43a in the form of a plate disposed parallel to the return plate 39 and provided with a respective shaped opening (not shown) which, as previously stated with reference to the opening 40, engages in a sliding manner a small block connected to the mobile pin 37.

The operation of said device will now be described. The device 1 can be associated with a conventional apparatus for applying a filler 45 on the bead core 46 of a pneumatic tire, or can work as a separate unit on the filler applied to the bead core during a previous processing.

In a known manner, the filler 45 is in the form of a strip of elastomeric material in uncured condition and has a substantially isosceles triangular cross-section having a very accentuated height and joined at its base to the circumferential outer chafer of the bead core 46.

The opposite ends 45a, 45b (FIGS. 3, 4 & 7) of the filler 45 mutually face each other, diverging one from the other when moving radially outwardly away from the peripheral chafer of the bead core 46. More particularly the ends 45a and 45b diverge according to a determinate angle α, so as to form a substantially "V" configuration.

In a manner known per se, the bead core 46, provided with a filler 45 arranged as described, is positioned in such a way that the part of its circumference comprising the ends 45a and 45b is symmetrically interposed between the gripping and clamping elements of the primary pliers systems 2, 2a and ancillary system 24.

Moreover, the positioning of the bead core 46 takes place also in such a way that the "V" formed by the ends 45a and 45b is arranged symmetrically with respect to the primary pliers systems 2, 2a as diagrammatically shown in FIG. 3.

Following the positioning of the bead core 46 and filler 45 associated thereto, the first fluid mechanics cylinders 18, 18a are set in action and acting on the respective control levers 17, 17a rotate angularly the corresponding clamping elements 11, 12 and 11a, 12a to approach each other. More particularly, in this step the clamping elements 11, 12 and 11a, 12a are translated from an open position where, as shown with a dashed line in FIGS. 5 and 6, are laterally separated by the filler 45, to a closing position where, as shown with a continuous line in the above said figures, they work against the opposite ends of the filler itself exerting opposed thrust forces.

Figure 6:
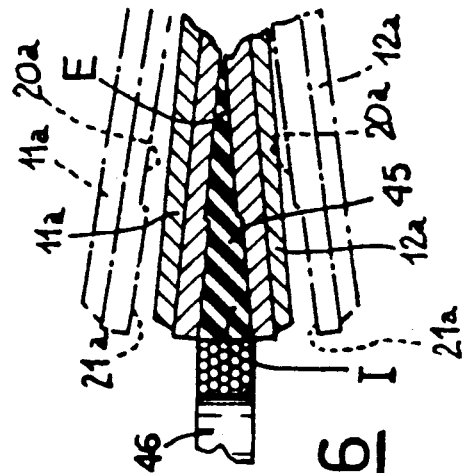
FIG. 6 is a diagrammatic section, taken along line VI—VI of FIG. 4, showing the deformation caused on the filler by the gripping elements of a second primary pliers system.

As shown in FIGS. 5 and 6, when the clamping elements 11, 12 and 11a, 12a are closing, the centering portions 21 and 21a of the respective contacting surfaces 20 work on a circumferential inner zone "I" of the filler 45, so that the positioning of said zones is maintained symmetric with respect to the median plane of the bead core 46. The offset portions 20 and 20a work so as to move it slightly away from the median plane of the bead core 46. It has to be noted that the offset portions 20 and 20a belonging respectively to the first and second pliers systems 2, 2a offset the corresponding circumferential outer zones "E" in opposite senses, so that they will be more advantageously positioned later on.

While the ends 45a and 45b are respectively kept between the clamping elements 11, 12 and 11a and 12a as described, the arms 3 and 4 are rotated angularly around their common pivoting axis to lead the pliers systems 2a and 2b from a rest position where, as shown in FIG. 3, they are mutually spaced for permitting the engagement of the filler 45 by the clamping elements themselves, to an operative position in which, as shown in FIG. 4, the pliers systems approach each other so as to splice the ends 45a and 45b. To this end, the movement of the arms 3 and 4 is controlled, for instance through a fluid mechanics cylinder (not shown), working between the driving small shaft 8 and the mobile sleeve 9 so as to rotate one pliers system with respect to the other.

Advantageously, the pivoting axis of the arms 3 and 4, namely the axis around which the primary pliers systems 2, 2a rotate angularly, passes in proximity of the point in which the "V" configuration of the ends 45a and 45b converges.

Preferably, the above axis of rotation slightly moves toward the center of the bead core with respect to the converging point of the "V". Originally, on translating from the rest position to the splicing position the primary pliers systems 2 and 2a rotate one with respect to the other according to the angulation shown in FIG. 4, which is greater than the angle α (shown in FIG. 3) formed by the ends 45a, 45b. Consequently, owing to the configuration conferred to the ends of the filler 45 by the clamping elements 11, 12 and 11a, 12a at the translation of the pliers systems 2, 2a into the splicing position, the circumferential inner zones "I" of the filler is butt-approached at the ends themselves, while the circumferential outer zones "E" are mutually placed side by side, as shown in the FIGS. 4 and 7.

At this point the ancillary pliers system 24 is set in action through the action of fluid mechanics cylinder 44.

More particularly, the stem 44a of the fluid mechanics cylinder 44 is removed from the cylinder itself to cause, through the control pin 42, a rotation of the return plate 39 according to the direction of the arrow A of FIG. 2. Following said rotation, the mobile pin 37 is moved along the guiding slots 38 toward the stationary pin 27, determining through the control rods 35, 36 a mutual spreading out of the continuations 33 and 34 presented by the gripping elements 25, 26. A mutual approaching of the gripping elements 25, 26 corresponds to the spreading out of the continuations 33, 34. Consequently, the circumferential outer zones "E" of the ends 45a and 45b, mutually placed side by side, in overlapping relationship and are compressed, one against the other, between the contacting surfaces 30 of the gripping elements 25, 26 as shown in FIG. 7.

In this situation, since the elastomeric material constituting the filler 45 is still uncured, a perfect splicing between the ends 45a and 45b is assured.

The present invention thus achieves the desired purposes.

The placing the ends of the filler side-by-side in the circumferential outer zones rather than end-to-end, solves the problem in the known technique by avoiding the difficulty of butt-splicing the ends themselves in the zones farther from the bead cores, where the filler has a very limited thickness.

Moreover, the lateral compression made on the ends of the filler by the ancillary pliers system eliminate the drawbacks in the known technique by the unavoidable expansion of the filler section at the splicing zone.

Of course, the present invention can include several changes and variations, without departing from the inventive concept which characterizes this invention as defined by the following claims.

What is claimed is:

1. Device for splicing the ends of an elastomeric filler applied on bead cores of pneumatic tires, said filler having a triangular cross-section and two opposed ends, the base of said triangular cross-section extending along a radial outer chafer of a bead core and having said ends mutually facing and diverging according to a substantially "V" configuration, one with respect to the other upon moving radially away from the peripheral chafer of the bead core, said device comprising two primary pliers systems, each one gripping one of the opposed ends of the filler through at least two facing gripping elements placed on opposite sides of the filler and moveable one with respect to the other from an open position, in which they are laterally separated from the filler to a closed position in which they work against the opposite sides of the filler to exert opposed thrust forces, said primary pliers system being angularly moveable around an axis of rotation near the point in which the "V" configuration of the filler ends converges, said pliers being moveable from a rest position in which they are mutually separated to permit the locking of the filler ends between said gripping elements to a splicing position in which they approach each other to splice said ends when said ends are held by the gripping elements in said closed position, said primary pliers systems being mounted so that upon translating from the rest position to the splicing position, they rotate one with respect to the other according to an angulation greater than the angle formed by the "V" configuration of the filler ends when the pliers systems are in the rest position, the gripping elements of each pliers system having respective contacting surfaces with respective offset portions which are offset with respect to offset portions of the contacting surfaces of the other primary pliers system and are positioned for acting on a radial outer zone of the filler to mutually place side by side in overlapping relationship the ends of the filler in said radial outer zone said device comprising also at least an ancillary pliers system arranged between said primary pliers systems and provided with respective gripping elements positioned side by side with respect to the opposite sides of the filler and mounted to compress the ends of the filler gripped by the action of the primary pliers systems.

2. Device according to claim 1 in which the offset portions of the gripping elements of each primary pliers system are positioned consecutively to respective centering portions of said contacting surfaces and arranged at the free ends of the clamping elements, coplanarly with respect to the centering portions of the clamping elements of the other primary pliers system.

3. Device according to claim 1 in which the axis of rotation of the primary pliers systems is positioned toward the center of the bead core with respect to the point in which the "V" configuration presented by the free ends of the filler converges.

4. Device according to claim 1 in which each primary pliers system comprises a supporting block integral with an arm pivoted in a rotating manner according to said axis of rotation, a pair of pins rotatably crossing the supporting block and engaging the clamping elements on the side of the supporting block facing toward the other primary pliers system, two gear wheels each one engaging one of said pins on the side of the supporting block opposite to the clamping elements and operatively engaging one another, a control level integral with one of said pins and a fluid mechanics cylinder mounted on the supporting block and connected to operate said control lever to provide mutual approach and separation of the clamping elements.

5. Device according to claim 1 in which said primary pliers systems are respectively supported by a first arm integral with a hub splined on a driving small shaft and by a second arm integral with a mobile sleeve rotatably engaging said hub and rotatably engaging a stationary sleeve rigidly connected to a supporting structure.

6. Device according to claim 1 in which said ancillary pliers system comprises a stationary pin mounted between a pair of supporting plates and rotatably engaging said gripping elements of said ancillary pliers system, a pair of control rods each one rotatably engaged with a continuation of one of said gripping elements of said ancillary pliers system, and a mobile pin engaging the control rods and engaged in a sliding manner along at least one guiding slot in at least one of said supporting plates and extending according to the axis of alignment between the mobile pin and the stationary pin, said mobile pin being translatable along said at least one guiding slot to provide mutual approach and separation of the gripping elements in consequence of the action of said control rods.

7. Device according to claim 6 in which said mobile pin is translatable in consequence of the action of a return plate provided with a shaped opening in which a control small block engaging the mobile pin is encased in a sliding manner within a direction transverse to the direction of the at least one guiding slot, said return plate being integral with a control pin rotatably crossing the supporting plates and rigidly engaging, on the side of the supporting plates opposite to the return plate, a control lever on which a fluid mechanics cylinder engaged with one of said supporting plates is connected.

* * * * *